(12) United States Patent
Idicula et al.

(10) Patent No.: US 7,797,310 B2
(45) Date of Patent: Sep. 14, 2010

(54) TECHNIQUE TO ESTIMATE THE COST OF STREAMING EVALUATION OF XPATHS

(75) Inventors: Sam Idicula, San Jose, CA (US); Ravi Murthy, Fremont, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 11/716,505

(22) Filed: Mar. 8, 2007

(65) Prior Publication Data

US 2008/0091623 A1    Apr. 17, 2008

Related U.S. Application Data

(60) Provisional application No. 60/829,652, filed on Oct. 16, 2006.

(51) Int. Cl.
*G06F 17/30* (2006.01)
(52) U.S. Cl. ...................................... 707/719
(58) Field of Classification Search ........................ None
See application file for complete search history.

(56) References Cited

U.S. PATENT DOCUMENTS

| | | | |
|---|---|---|---|
| 4,993,025 A | 2/1991 | Vesel et al. |
| 5,202,982 A | 4/1993 | Gramlich et al. |
| 5,210,686 A | 5/1993 | Jernigan |
| 5,226,137 A | 7/1993 | Bolan et al. |
| 5,247,658 A | 9/1993 | Barrett et al. |
| 5,257,366 A | 10/1993 | Adair et al. |
| 5,295,256 A | 3/1994 | Bapat |
| 5,295,261 A | 3/1994 | Simonetti |
| 5,307,490 A | 4/1994 | Davidson et al. |
| 5,313,629 A | 5/1994 | Abraham et al. |
| 5,327,556 A | 7/1994 | Mohan et al. |
| 5,369,763 A | 11/1994 | Biles |
| 5,388,257 A | 2/1995 | Bauer |

(Continued)

FOREIGN PATENT DOCUMENTS

EP       856803  A2    8/1998

(Continued)

OTHER PUBLICATIONS

DataGuides: Enabling Query Formulation and Optimization in Semistructured Databases, R Goldman, J Widom, the international conference on Very Large Data Bases, 1997.*

(Continued)

*Primary Examiner*—Neveen Abel Jalil
*Assistant Examiner*—Kevin Young
(74) *Attorney, Agent, or Firm*—Hickman Palermo Truong & Becker LLP; Deborah L. Caswell

(57) ABSTRACT

A method and apparatus for estimating the cost of streaming evaluation of XPaths is provided. Aggregate statistics are maintained by the database server upon initiation of a database function by the database administrator about the nodes of the XML document. Based upon these statistics and the complexity of the particular XPath query, an estimate of the cost of the query, in time and computing resources required, is computed.

26 Claims, 2 Drawing Sheets

U.S. PATENT DOCUMENTS

| | | |
|---|---|---|
| 5,404,513 A | 4/1995 | Powers et al. |
| 5,410,691 A | 4/1995 | Taylor |
| 5,454,101 A | 9/1995 | Mackay et al. |
| 5,463,772 A | 10/1995 | Thompson et al. |
| 5,467,471 A | 11/1995 | Bader |
| 5,499,371 A | 3/1996 | Henninger et al. |
| 5,504,892 A | 4/1996 | Atsatt et al. |
| 5,506,991 A | 4/1996 | Curry et al. |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,561,763 A | 10/1996 | Eto et al. |
| 5,566,331 A | 10/1996 | Irwin, Jr. et al. |
| 5,568,640 A | 10/1996 | Nishiyama et al. |
| 5,574,915 A | 11/1996 | Lemon et al. |
| 5,625,815 A | 4/1997 | Maier et al. |
| 5,630,125 A | 5/1997 | Zellweger |
| 5,643,633 A | 7/1997 | Telford et al. |
| 5,680,614 A | 10/1997 | Bakuya et al. |
| 5,682,524 A | 10/1997 | Freund et al. |
| 5,684,990 A | 11/1997 | Boothby |
| 5,689,706 A | 11/1997 | Rao et al. |
| 5,701,467 A | 12/1997 | Freeston |
| 5,724,577 A | 3/1998 | Exley et al. |
| 5,734,887 A | 3/1998 | Kingberg et al. |
| 5,737,736 A | 4/1998 | Chang |
| 5,758,153 A | 5/1998 | Atsatt et al. |
| 5,802,518 A | 9/1998 | Karaev et al. |
| 5,819,275 A | 10/1998 | Badger et al. |
| 5,822,511 A | 10/1998 | Kashyap et al. |
| 5,832,526 A | 11/1998 | Schuyler |
| 5,838,965 A | 11/1998 | Kavanagh et al. |
| 5,842,212 A | 11/1998 | Balluvio et al. |
| 5,848,246 A | 12/1998 | Gish |
| 5,870,590 A | 2/1999 | Kita et al. |
| 5,878,415 A | 3/1999 | Olds |
| 5,878,434 A | 3/1999 | Draper et al. |
| 5,892,535 A | 4/1999 | Allen et al. |
| 5,897,632 A | 4/1999 | Dar et al. |
| 5,905,990 A | 5/1999 | Inglett |
| 5,915,253 A | 6/1999 | Christiansen |
| 5,917,492 A | 6/1999 | Bereiter et al. |
| 5,918,225 A | 6/1999 | White et al. |
| 5,921,582 A | 7/1999 | Gusack |
| 5,937,406 A | 8/1999 | Balabine et al. |
| 5,940,591 A | 8/1999 | Boyle et al. |
| 5,960,194 A | 9/1999 | Choy et al. |
| 5,964,407 A | 10/1999 | Sandkleiva |
| 5,974,407 A | 10/1999 | Sacks |
| 5,978,791 A | 11/1999 | Farber et al. |
| 5,983,215 A | 11/1999 | Ross et al. |
| 5,987,506 A | 11/1999 | Carter et al. |
| 5,991,771 A | 11/1999 | Falls et al. |
| 5,999,936 A * | 12/1999 | Pattison et al. .............. 707/101 |
| 5,999,941 A | 12/1999 | Andersen |
| 6,003,040 A | 12/1999 | Mital et al. |
| 6,012,067 A | 1/2000 | Sarkar |
| 6,018,747 A | 1/2000 | Burns et al. |
| 6,023,706 A | 2/2000 | Schmuck et al. |
| 6,023,765 A | 2/2000 | Kuhn |
| 6,029,160 A | 2/2000 | Cabrera et al. |
| 6,029,166 A | 2/2000 | Mutalik et al. |
| 6,029,175 A | 2/2000 | Chow et al. |
| 6,038,563 A | 3/2000 | Bapat et al. |
| 6,052,122 A | 4/2000 | Sutcliffe et al. |
| 6,055,544 A | 4/2000 | DeRose et al. |
| 6,061,684 A | 5/2000 | Glasser et al. |
| 6,088,694 A | 7/2000 | Burns et al. |
| 6,092,086 A | 7/2000 | Martin et al. |
| 6,101,500 A | 8/2000 | Lau |
| 6,111,578 A | 8/2000 | Tesler |
| 6,112,209 A | 8/2000 | Gusack |
| 6,115,741 A | 9/2000 | Domenikos et al. |
| 6,119,118 A | 9/2000 | Kain, III et al. |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,185,574 B1 | 2/2001 | Howard et al. |
| 6,189,012 B1 | 2/2001 | Mital et al. |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmone |
| 6,212,512 B1 | 4/2001 | Barney et al. |
| 6,212,557 B1 | 4/2001 | Oran |
| 6,230,310 B1 | 5/2001 | Arrouye et al. |
| 6,233,729 B1 | 5/2001 | Campara et al. |
| 6,236,988 B1 | 5/2001 | Aldred |
| 6,240,407 B1 | 5/2001 | Chang et al. |
| 6,247,024 B1 | 6/2001 | Kincaid |
| 6,263,332 B1 | 7/2001 | Nasr et al. |
| 6,263,345 B1 | 7/2001 | Farrar et al. |
| 6,269,380 B1 | 7/2001 | Terry et al. |
| 6,269,431 B1 | 7/2001 | Dunham |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,301,605 B1 | 10/2001 | Napolitano et al. |
| 6,321,219 B1 | 11/2001 | Gainer et al. |
| 6,330,573 B1 | 12/2001 | Salisbury et al. |
| 6,339,382 B1 | 1/2002 | Arbinger et al. |
| 6,341,289 B1 | 1/2002 | Burroughs et al. |
| 6,343,287 B1 | 1/2002 | Kumar et al. |
| 6,349,295 B1 | 2/2002 | Tedesco et al. |
| 6,356,920 B1 | 3/2002 | Vandersluis |
| 6,363,371 B1 | 3/2002 | Chaudhuri et al. |
| 6,366,921 B1 | 4/2002 | Hansen et al. |
| 6,366,934 B1 | 4/2002 | Cheng et al. |
| 6,370,537 B1 | 4/2002 | Gilbert et al. |
| 6,370,548 B1 | 4/2002 | Bauer et al. |
| 6,389,427 B1 | 5/2002 | Faulkner |
| 6,389,433 B1 | 5/2002 | Bolosky et al. |
| 6,393,435 B1 | 5/2002 | Gartner et al. |
| 6,397,231 B1 | 5/2002 | Salisbury et al. |
| 6,418,448 B1 | 7/2002 | Sarkar |
| 6,421,692 B1 | 7/2002 | Milne et al. |
| 6,427,123 B1 | 7/2002 | Sedlar |
| 6,438,540 B2 | 8/2002 | Nasr et al. |
| 6,438,550 B1 | 8/2002 | Doyle et al. |
| 6,438,562 B1 | 8/2002 | Gupta et al. |
| 6,442,548 B1 | 8/2002 | Balabine et al. |
| 6,446,091 B1 | 9/2002 | Noren et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,529,901 B1 | 3/2003 | Chaudhuri et al. |
| 6,539,398 B1 | 3/2003 | Hannan et al. |
| 6,542,898 B1 | 4/2003 | Sullivan et al. |
| 6,571,231 B2 | 5/2003 | Sedlar |
| 6,574,655 B1 | 6/2003 | Libert et al. |
| 6,584,459 B1 | 6/2003 | Chang et al. |
| 6,594,675 B1 | 7/2003 | Schneider |
| 6,598,055 B1 | 7/2003 | Keesey et al. |
| 6,604,100 B1 | 8/2003 | Fernandez et al. |
| 6,609,121 B1 | 8/2003 | Ambrosini et al. |
| 6,611,843 B1 | 8/2003 | Jacobs |
| 6,615,203 B1 | 9/2003 | Lin et al. |
| 6,636,845 B2 | 10/2003 | Chau et al. |
| 6,643,633 B2 | 11/2003 | Chau et al. |
| 6,662,342 B1 | 12/2003 | Marcy |

| | | | | | |
|---|---|---|---|---|---|
| 6,675,230 B1 | 1/2004 | Lewallen | 2003/0069881 A1 | 4/2003 | Huttunen |
| 6,681,221 B1 | 1/2004 | Jacobs | 2003/0078906 A1 | 4/2003 | Ten-Hove et al. |
| 6,684,227 B2 | 1/2004 | Duxbury | 2003/0084056 A1 | 5/2003 | DeAnna et al. |
| 6,697,805 B1 | 2/2004 | Choquier et al. | 2003/0093672 A1 | 5/2003 | Cichowlas |
| 6,704,739 B2 | 3/2004 | Craft et al. | 2003/0101194 A1 | 5/2003 | Rys et al. |
| 6,704,747 B1 | 3/2004 | Fong | 2003/0105732 A1 | 6/2003 | Kagalwala et al. |
| 6,708,186 B1 | 3/2004 | Claborn et al. | 2003/0131051 A1 | 7/2003 | Lection et al. |
| 6,718,322 B1 | 4/2004 | Brye | 2003/0158897 A1 | 8/2003 | Ben-Natan |
| 6,721,723 B1 | 4/2004 | Gibson et al. | 2003/0163519 A1 | 8/2003 | Kegel et al. |
| 6,725,212 B2 | 4/2004 | Couch et al. | 2003/0167277 A1 | 9/2003 | Hejlsberg et al. |
| 6,732,222 B1 | 5/2004 | Garritsen et al. | 2003/0172135 A1 | 9/2003 | Bobick et al. |
| 6,754,661 B1 | 6/2004 | Hallin et al. | 2003/0177341 A1 | 9/2003 | Devillers |
| 6,772,350 B1 | 8/2004 | Belani et al. | 2003/0182276 A1 | 9/2003 | Bossman et al. |
| 6,778,977 B1 | 8/2004 | Avadhanam et al. | 2003/0182624 A1 | 9/2003 | Large |
| 6,785,673 B1 | 8/2004 | Fernandez et al. | 2003/0212662 A1 | 11/2003 | Shin et al. |
| 6,795,821 B2 | 9/2004 | Yu | 2003/0212664 A1 | 11/2003 | Breining et al. |
| 6,801,224 B1 | 10/2004 | Lewallen | 2003/0226111 A1 | 12/2003 | Wirts et al. |
| 6,826,568 B2 | 11/2004 | Bernstein et al. | 2004/0010752 A1 | 1/2004 | Chan et al. |
| 6,826,727 B1 | 11/2004 | Mohr et al. | 2004/0043758 A1 | 3/2004 | Sorvari et al. |
| 6,836,778 B2 | 12/2004 | Manikutty et al. | 2004/0044659 A1 | 3/2004 | Judd et al. |
| 6,836,857 B2 | 12/2004 | Ten-Hove et al. | 2004/0064466 A1 | 4/2004 | Manikutty et al. |
| 6,871,204 B2 | 3/2005 | Krishaprasad et al. | 2004/0083209 A1 | 4/2004 | Shin |
| 6,901,403 B1 | 5/2005 | Bata et al. | 2004/0088320 A1 | 5/2004 | Perry |
| 6,915,304 B2 | 7/2005 | Krupa | 2004/0088415 A1 | 5/2004 | Chandrasekar et al. |
| 6,920,457 B2 | 7/2005 | Pressmar | 2004/0103105 A1 | 5/2004 | Lindblad et al. |
| 6,947,927 B2 | 9/2005 | Chaudhuri et al. | 2004/0103282 A1 | 5/2004 | Meier et al. |
| 6,964,025 B2 | 11/2005 | Angiulo et al. | 2004/0128296 A1 | 7/2004 | Krishnamurthy et al. |
| 7,031,956 B1 | 4/2006 | Lee et al. | 2004/0143581 A1 | 7/2004 | Bohannon et al. |
| 7,043,487 B2 | 5/2006 | Krishnamurthy et al. | 2004/0148278 A1 | 7/2004 | Milo et al. |
| 7,043,488 B1 | 5/2006 | Baer et al. | 2004/0163041 A1* | 8/2004 | Engel ........................ 715/509 |
| 7,089,239 B1 | 8/2006 | Baer et al. | 2004/0167864 A1 | 8/2004 | Wang et al. |
| 7,113,936 B1 | 9/2006 | Michel et al. | 2004/0176958 A1 | 9/2004 | Salmenkaita et al. |
| 7,120,645 B2 | 10/2006 | Manikutty et al. | 2004/0177080 A1 | 9/2004 | Doise et al. |
| 7,139,746 B2* | 11/2006 | Shin et al. ........................ 707/2 | 2004/0205551 A1 | 10/2004 | Santos |
| 7,139,749 B2 | 11/2006 | Bossman et al. | 2004/0210573 A1 | 10/2004 | Abe et al. |
| 7,162,485 B2 | 1/2007 | Gottlob et al. | 2004/0215626 A1 | 10/2004 | Colossi et al. |
| 7,171,404 B2 | 1/2007 | Lindblad et al. | 2004/0220912 A1 | 11/2004 | Manikutty et al. |
| 7,171,407 B2 | 1/2007 | Barton et al. | 2004/0220927 A1 | 11/2004 | Murthy et al. |
| 7,174,328 B2 | 2/2007 | Stanoi et al. | 2004/0220946 A1 | 11/2004 | Krishnaprasad et al. |
| 7,216,127 B2 | 5/2007 | Auerbach | 2004/0225680 A1 | 11/2004 | Cameron et al. |
| 7,228,312 B2 | 6/2007 | Chaudhuri et al. | 2004/0230667 A1 | 11/2004 | Wookey |
| 7,315,852 B2 | 1/2008 | Balmin et al. | 2004/0230893 A1 | 11/2004 | Elza et al. |
| 7,386,568 B2 | 6/2008 | Warner et al. | 2004/0236762 A1 | 11/2004 | Chaudhuri et al. |
| 7,433,885 B2 | 10/2008 | Jones | 2004/0255046 A1 | 12/2004 | Ringseth et al. |
| 2001/0037345 A1 | 11/2001 | Kiernan et al. | 2004/0260683 A1 | 12/2004 | Chan et al. |
| 2001/0049675 A1 | 12/2001 | Mandler et al. | 2004/0267760 A1 | 12/2004 | Brundage et al. |
| 2002/0015042 A1 | 2/2002 | Robotham et al. | 2004/0268244 A1 | 12/2004 | Levanoni et al. |
| 2002/0035606 A1 | 3/2002 | Kenton | 2005/0004907 A1 | 1/2005 | Bruno et al. |
| 2002/0038358 A1 | 3/2002 | Sweatt, III et al. | 2005/0010896 A1 | 1/2005 | Meliksetian et al. |
| 2002/0056025 A1 | 5/2002 | Qiu et al. | 2005/0027701 A1 | 2/2005 | Zane et al. |
| 2002/0073019 A1 | 6/2002 | Deaton | 2005/0038688 A1 | 2/2005 | Collins et al. |
| 2002/0078068 A1 | 6/2002 | Krishnaprasad et al. | 2005/0050016 A1 | 3/2005 | Stanoi et al. |
| 2002/0087596 A1 | 7/2002 | Lewontin | 2005/0050058 A1 | 3/2005 | Jain et al. |
| 2002/0116371 A1 | 8/2002 | Dodds et al. | 2005/0050092 A1 | 3/2005 | Jain et al. |
| 2002/0116457 A1 | 8/2002 | Eshleman et al. | 2005/0065949 A1 | 3/2005 | Warner et al. |
| 2002/0120685 A1 | 8/2002 | Srivastava et al. | 2005/0091188 A1* | 4/2005 | Pal et al. ........................ 707/1 |
| 2002/0123993 A1 | 9/2002 | Chau et al. | 2005/0097084 A1 | 5/2005 | Balmin et al. |
| 2002/0124100 A1 | 9/2002 | Adams | 2005/0120031 A1 | 6/2005 | Ishii |
| 2002/0133484 A1 | 9/2002 | Hoang et al. | 2005/0138047 A1 | 6/2005 | Liu et al. |
| 2002/0143512 A1 | 10/2002 | Shamoto et al. | 2005/0203933 A1 | 9/2005 | Chaudhuri et al. |
| 2002/0152267 A1 | 10/2002 | Lennon | 2005/0228786 A1 | 10/2005 | Murthy et al. |
| 2002/0156772 A1 | 10/2002 | Chau et al. | 2005/0228791 A1 | 10/2005 | Thusoo et al. |
| 2002/0156811 A1 | 10/2002 | Krupa | 2005/0228792 A1 | 10/2005 | Chandrasekaran et al. |
| 2002/0167748 A1 | 11/2002 | Kulakowski et al. | 2005/0228818 A1 | 10/2005 | Murthy et al. |
| 2002/0184188 A1 | 12/2002 | Mandyam et al. | 2005/0229158 A1 | 10/2005 | Thusoo et al. |
| 2002/0184401 A1 | 12/2002 | Kadel, Jr. et al. | 2005/0240624 A1 | 10/2005 | Ge et al. |
| 2002/0188613 A1 | 12/2002 | Chakraborty et al. | 2005/0257201 A1 | 11/2005 | Rose et al. |
| 2002/0194157 A1 | 12/2002 | Zait et al. | 2005/0289125 A1 | 12/2005 | Liu et al. |
| 2002/0198874 A1 | 12/2002 | Nasr et al. | 2005/0289175 A1 | 12/2005 | Krishnaprasad et al. |
| 2003/0004937 A1 | 1/2003 | Salmenkaita et al. | 2006/0021246 A1 | 2/2006 | Schulze et al. |
| 2003/0009361 A1 | 1/2003 | Hancock et al. | 2006/0031204 A1 | 2/2006 | Liu et al. |
| 2003/0014397 A1 | 1/2003 | Chau et al. | 2006/0031233 A1 | 2/2006 | Liu et al. |
| 2003/0065659 A1 | 4/2003 | Agarwal et al. | 2006/0129584 A1 | 6/2006 | Hoang et al. |

| | | | |
|---|---|---|---|
| 2007/0011167 | A1 | 1/2007 | Krishnaprasad et al. |
| 2007/0043696 | A1* | 2/2007 | Haas et al. ............... 707/2 |
| 2007/0083809 | A1 | 4/2007 | Tarachandani et al. |
| 2007/0271305 | A1 | 11/2007 | Chandrasekar et al. |
| 2008/0222087 | A1* | 9/2008 | Balmin et al. .............. 707/2 |
| 2010/0030727 | A1 | 2/2010 | Chandrasekar et al. |

FOREIGN PATENT DOCUMENTS

| | | |
|---|---|---|
| EP | 1 241589 A2 | 9/2002 |
| WO | WO 97/46956 | 12/1997 |
| WO | WO 00/14632 | 3/2000 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |
| WO | WO 03107576 | 12/2003 |
| WO | WO 2006026534 | 3/2006 |

OTHER PUBLICATIONS

XPath Queries on Streaming Data , F. Peng and S. Chawathe (Proceedings of the 2003 ACM SIGMOD international conference on Management of data).*

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272.

Cheng, Josephine et al., "IBM DB2 XML Extender," IEEE, ICDE '00 Conference, San Diego, Feb. 2000, 128 pages.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Peng, Feng et al., "XPath queries on streaming data" (2003) *ACM Press*, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XReI: A Path-Based Approach to Storage and Retrieval of XML Documents Using Relational Databases", XP-001143686, *ACM Transactions on Internet Technology* (2001), pp. 110-141.

Zisman et al., "Using XML to Build Consistency Rules for Distributed Specifications," Proceedings of the Tenth International Workshop on Software Specification and Design (IWSD'00), IEEE 2000, 8 pages.

PCT/US2007/010163, Notification of Transmittal of the International Search Report and the Written Opinion of the International Searching Authority, Oct. 12, 2007, 12 pages.

Khan, Latifur, et al, "A Performance Evaluation of Storing XML Data in Relational Database Management Systems,"ACM-2001 (pp. 31-38).

Kudrass, Thomas, "Management of XML Documents Without Schema in Relational Database Systems," Information and Software Technology, vol. 44, No. 4, Mar. 31, 2002, XP-004347776, pp. 269-275.

McHugh, Jason, et al. "Indexing Semistructured Data," Stanford Science Department, 1998, XP-002248313, pp. 1-21.

Melton, Jim, "ISO-ANSI Working Draft, XML-Related Specifications (SQL/XML)," WG3: DRS-020, H2-2002-365, Aug. 2002, 154 pages.

Murthy, Ravi et al., "XML Schemas in Oracle XML DB," Proceedings of the 29th VLDB Conference, 2003, IEEE XP-002353604, pp. 1009-1018.

Oracle, "Oracle iFS (Internet File System)," Mar. 1999, XP-002204710, 3 pages.

Oracle, "Oracle9*i* Application Server, Administrator's Guide," Release 2 (9.0.2), May 2002, Part No. A92171-02, Part No. A92171-02, pp. 1-392. (Submitted in two parts).

Oracle, "Oracle9i XML Database Developer's Guide—Oracle XML DB," Release 2 (9.2), Oct. 2002, Part No. A96620-2, chapters 5 (86 pages), 10 (55 pages) & 11 (24 pages), (submitted in three separate pdf files).

Park, Joon S., "Towards Secure Collaboration on the Semantic Web", (2003) ACM Press, vol. 33, Issue 2, pp. 1-10.

Ramakrishnan, Raghu et al., "SRQL: Sorted Relational Query Language", Jul. 1-3, 1998 IEEE pp. 84-95.

Rao, Herman-Hwa, et al., "An Overview of the Internet File System," 1997, IEEE, XP-002204711, pp. 474-477.

Ricardo, Cathrine, "Database Systems: Principles, Design, & Implementation," 1990, MacMillian Publishing Co., pp. 357-361, 379-380.

Ruey-Shun, Chen, et al., "Developing an XML framework for metadata system", Trinity College Dublin, Proc. of the 1st Inter. Sympo. on Information and Communication, pp. 267-272.

Schmidt et al.—"Efficient Relational Storage and Retrieval of XML Documents", Lecture Notes in Computer Science, Selected papers from the Third International Workshop WebDB 2000 on The World Wide Web and Databases, ISBN: 3-540-41826-1, 2000, 6 pages.

Shanmugasundaram, J., et al. "Querying XML Views of Relational Data," Proceedings of the 27th Very Large Databases Conference, Rome, Italy, Sep. 2001, pp. 261-270.

Thekkath, Chandramohan A. et al., "Implementing network protocols at user level" (1993) ACM Press, pp. 64-73.

W3C, "Extensible Markup Language (XML) 1.0 (Third Edition)", W3C Recommendation, dated Feb. 4, 2004, 36 pages.

W3C, "XML Fragment Interchange," W3C Working Draft, Jun. 30, 1999, XP-002167090, 13 pages.

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XML Path Language (XPath) 2.0," W3C Working Draft Dated Apr. 4, 2005, 74 pages.

W3C, "XML Schema Part 1: Structures," W3C Recommendation, May 2, 2001, http://www.w3.org/TR/2001/REC-xmlschema-1-20010502/, 186 pages.

W3C, "XML Schema Part 2: Datatypes," W3C Recommendation, May 2, 2001, http://www.w3.org/TR/2001/REC-xmlschema-2-20010502/, 138 pages.

W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.

W3C, "XQuery 1.0 and XPath 2.0 Data Model," W3C Working Draft dated Apr. 4, 2005, 70 pages.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, 95 pages.

W3C, "XQuery 1.0: An XML Query Language," W3C Working Draft dated Apr. 4, 2005, 129 pages.

Wallach, Deborah A. et al., "ASHs: Application-specific handlers for high-performance messaging" (1996) ACM Press, pp. 1-13.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Wansong, et al., "An Encoding Scheme for Indexing XML Data," E-Commerce and E-Service, 2004, XP-010697639, pp. 526-529.

Zhang, Xin et al., "Honey, I Shrunk the XQuery!—An XML Algebra Optimization Approach," Submission for WIDM'02, IEEE XP-002316448, 14 pages.

Aboulnaga, A. et al., "Estimating the Selectivity of XML Path Expressions for Internet Scale Applications" Proceedings of the 27th VLDB Conference, Roma, Italy 2001 (10 pages).

Kotsakis, E., "Structured Information Retrieval in XML Documents" SAC 2002, Madrid, Spain (pp. 663-667).

Polyzotis, N. et al., "Statistical Synopses for Graph Structured XML Databases" ACM SIGMOD Jun. 4-6, 2002, Madison, Wisconsin, USA (12 pages).

Lumpkin, George et al., Oracle Corporation, "Query Optimization in Oracle9i," An Oracle White Paper, Feb. 2002, pp. 1-29.

Oracle Corp., "Oracle9iDatabase Daily Feature, Oracle9i Optimizer Statistics Collection Enhancements," Apr. 23, 2003, http://otn.oracle.com/products/oracle9i/daily/apr23.html?_template=/ocom/technology/con, pp. 1-2.

Burleson, Donald K., Oracle Corporation, "Cost Control: Inside the Oracle Optimizer," 2003, http://otn.oracle.com/oramag/columns/2003/techarticles/burleson_cob_pt1.html, data retrieved Jul. 16, 2004, 15 pages.

Banerjee, Sandeepan, Oracle Corporation, "Oracle 9i 'Project XDB'—The XML Database," http://www.grandpoohbah.net/Sandeepan/IOUG2001XDB.htm, data retrieved Feb. 6, 2004, pp. 1-18.

Oracle Corp., "Resource_View and Path_View," Oracle9iXML Database Developer's Guide—Oracle XML DB, Release 2 (9.2), Part No. A96620-02, 2002, http://www.cs.utah.edu/classes/cs5530/oracle/doc/B10501_01/appdev.920/a99620/xdb19res, data retrieved Feb. 6, 2004, pp. 1-13.

Oracle Corp., "Under_Path," Oracle9iSQL Reference, Release 2 (9.2), Part No. A96540-01, 1996, 2002, http://www.lc.leidenuniv.nl/awcourse/oracle/server.920/a96540/conditions12a.htm, data retrieved Feb. 6, 2004, pp. 1-2.

Jagadish et al., "TIMBER: A Native XML Database", The VLDB Journal, published online Dec. 19, 2002.

McHugh et al., "Query Optimization for XML", Proceedings of the 25th VLDB Conference, 1999, pp. 315-326.

Halverson et al., "Mixed Mode XML Query Processing", Proceedings of the 29th VLDB Conference, Sep. 12-13, 2003, pp. 225-236.

Bohannon et al., "From XML Schema to Relations: A Cost-Based Approach to XML Storage", IEEE ICDE, 2002.

Aboulnaga et al., "Building XML Statistics for the Hidden Web", Proceedings of the 28th VLDB Conference, 2002.

Microsoft Press, "Microsoft Computer Dictionary", 2002, Microsoft Press, Fifth Edition, 3 pages.

Girardot et al., "Millau: an encoding format for efficient representation and exchange of XMLover the Web", IBM Almaden Research Center, 24 pages.

Shankar Pal et al., "Indexing XML Data Stored in a Relational Database", Proceedings of the 30th VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

Banerjee, Vishu Krishnamurthy et al.,"Oracle8i—The XML Enabled Data Management System"—Oracle Corporation, Mar. 2000 IEEE pp. 561-568.

Bourret, R. et al.: A generic Load/Extract Utility for Data Transfer Between XML Documents and Relational Databases, Jun. 8-9, 2000, IEEE Computing SOC., pp. 134-143.

Braga, Daniele,et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract, 1 page.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data ," Proceeding of the International Conference on Very Large Databases, 2001, XP-002303292, pp. 341-350.

Dayen, I., "Storing XML in Relational Databases", XML.com XP-002275971(1998-2004) pp. 1-13.

Diao, Y. et al., "Path Sharing and Predicate Evaluation for High-Performance XML Filtering" XP-002344354 *ACM Transactions on Database Systems* (2003), pp. 467-516.

Diao, Y. et al., "YFilter: Efficient and Scalable Filtering of XML Documents" *IEEE* (2002), 2 pages.

Drake, Mark et al., Oracle Corporation, "Understanding the Oracle9i XML Type," Nov. 1, 2001, http://otn.oracle.com/oramag/oracle/01-nov/o61xml.html?_template=/ocom/technology, data retrieved Jun. 29, 2004, pp. 1-5.

Funderbunk, J. et al., "XML programming with SQL/XML and XQuery", *IBM Systems Journal*, XP-002295973 (2002), pp. 642-665.

Gennick, Johnathan, Oracle Corporation, "SQL in, XML out," May 1, 2003, http://otn.oracle.com/oramag/oracle/03-may/o33xml.html?_template=/ocom/technology, data retrieved Jun. 29, 2004, pp. 1-4.

Helmer, S. et al., "Optimized Translations of XPath into Algebraic Expressions Parameterized by Programs Containing Navigational Primitives" *IEEE* (2002), 10 pages.

Hierarchical Queries, XP-002295972, pp. 8-3 to 8-7.

Higgins, Shelley, Oracle Corporation, "Oracle9i, Application Developer's Guide—XML," Release 1 (9.0.1), Jun. 2001, Part No. A88894-01, pp. 1-1,362. (Submitted in five parts).

Higgins, Shelley, Oracle Corporation, "Oracle9i, Case Studies—XML Applications," Release 1 (9.0.1), Jun. 2001, Part No. A88895-01, pp. 1-462.

Jajodia, Sushil, et al., "Toward a Multilevel Secure Relational Data Model," ACM, 1991, 8393 SIGMOD Record, Jun. 20, 1991, No. 2, New York, US, XP 000364619, 10 pages.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Katz, Howard et al., "Integrating XQuery and Relational Database Systems," Chapter 7—XQuery from the Experts: A Guide to the W3C XML Query Language, Addison Wesley Professional, Aug. 22, 2003, ISBM 978-0-321-18060-5, pp. 353-391.

\* cited by examiner

TECHNIQUE TO ESTIMATE THE COST OF STREAMING EVALUATION OF XPATHS

CROSS REFERENCE TO RELATED APPLICATION

This application claims the benefit of priority to U.S. Provisional Patent Application No. 60/829,652 filed on Oct. 16, 2006, entitled "ENHANCEMENTS FOR PROCESSING XML DATA" which is incorporated by reference in its entirety for all purposes as if originally set forth herein.

This application is related to U.S. patent application Ser. No. 11/184,302 filed on Jul. 18, 2005, entitled "A MECHANISM FOR COMPUTING STRUCTURAL SUMMARIES OF XML DOCUMENT COLLECTIONS IN A DATABASE SYSTEM" which is incorporated by reference in its entirety for all purposes as if originally set forth herein.

FIELD OF THE INVENTION

The present invention relates to managing XML content within a database system, and more specifically to queries on that XML content.

BACKGROUND

The Extensible Markup Language (XML) is the standard for data and documents that is finding wide acceptance in the computer industry. XML describes and provides structure to a body of data, such as a file or data packet, referred to herein as an XML entity. The XML standard provides for tags that delimit sections of an XML entity referred to as XML elements. Each XML element may contain one or more name-value pairs referred to as attributes.

By defining an element that contains attributes and descendant elements, the XML entity defines a hierarchical tree relationship between the element, its descendant elements, and its attribute. A set of elements that have such a hierarchical tree relationship is referred to herein as an XML document.

An important standard for XML is the XQuery 1.0 and XPath 2.0 Data Model. (see W3C Candidate Recommendation 8 Jun. 2006, which is incorporated herein by reference). One aspect of this model is that a XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents an XML document, a node can correspond to an element, the child nodes of the node correspond to an attribute or another element contained in the element. The node may be associated with a name and value.

XML Storage Mechanisms

Various types of storage mechanisms are used to store an XML document. XML Type is a data type used to store XML content on database systems. XML documents stored as an XML Type allows developers to manipulate XML content using built-in functions. One type of storage mechanism stores an XML document as a text file in a file system. This may be in the form of a CLOB, or character large object, storing the actual XML text.

Another type of storage mechanism uses object-relational database systems that have been enhanced to store and query XML documents. In an embodiment, an XML document is stored in a row of a table and nodes of the XML document are stored in separate columns in the row. An XML document may also be stored as a hierarchy of objects in an object-relational database; each object is an instance of an object class and stores one or more elements of an XML document. The object class defines, for example, the structure corresponding to an element, and includes references or pointers to objects representing the immediate descendants of the element. Tables and/or objects of a database system that hold XML values are referred to herein as base tables or objects.

An XML document may also be stored as a binary representation. This is stored as a BLOB, or binary large object, in some binary form of the XML. Storing the XML document in binary form is an efficient form of data storage because it allows for quick access and processing by the database server.

XML Query Operations Supported by Object-Relational Database

It is important for object-relational database systems that store XML documents to be able to execute queries using XML query languages, such as XQuery/XPath. XML Query Language ("XQuery") and XML Path Language ("XPath") are important standards for a query language, which can be used in conjunction with SQL to express a large variety of useful queries. XPath is described in XML Path Language (XPath), version 1.0 (W3C Recommendation 16 Nov. 1999), which is incorporated herein by reference. XPath 2.0 and XQuery 1.0 are described in XQuery 1.0 and XPath 2.0 Full-Text. (W3C Working Draft 09 Jul. 2004), which is incorporated herein by reference.

Like any type query processed by a database system, it is important for the database management system to be able to compute the cost of executing queries that contain expressions conforming to XPath. Therefore, there is a clear need for techniques for computing costs of such queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
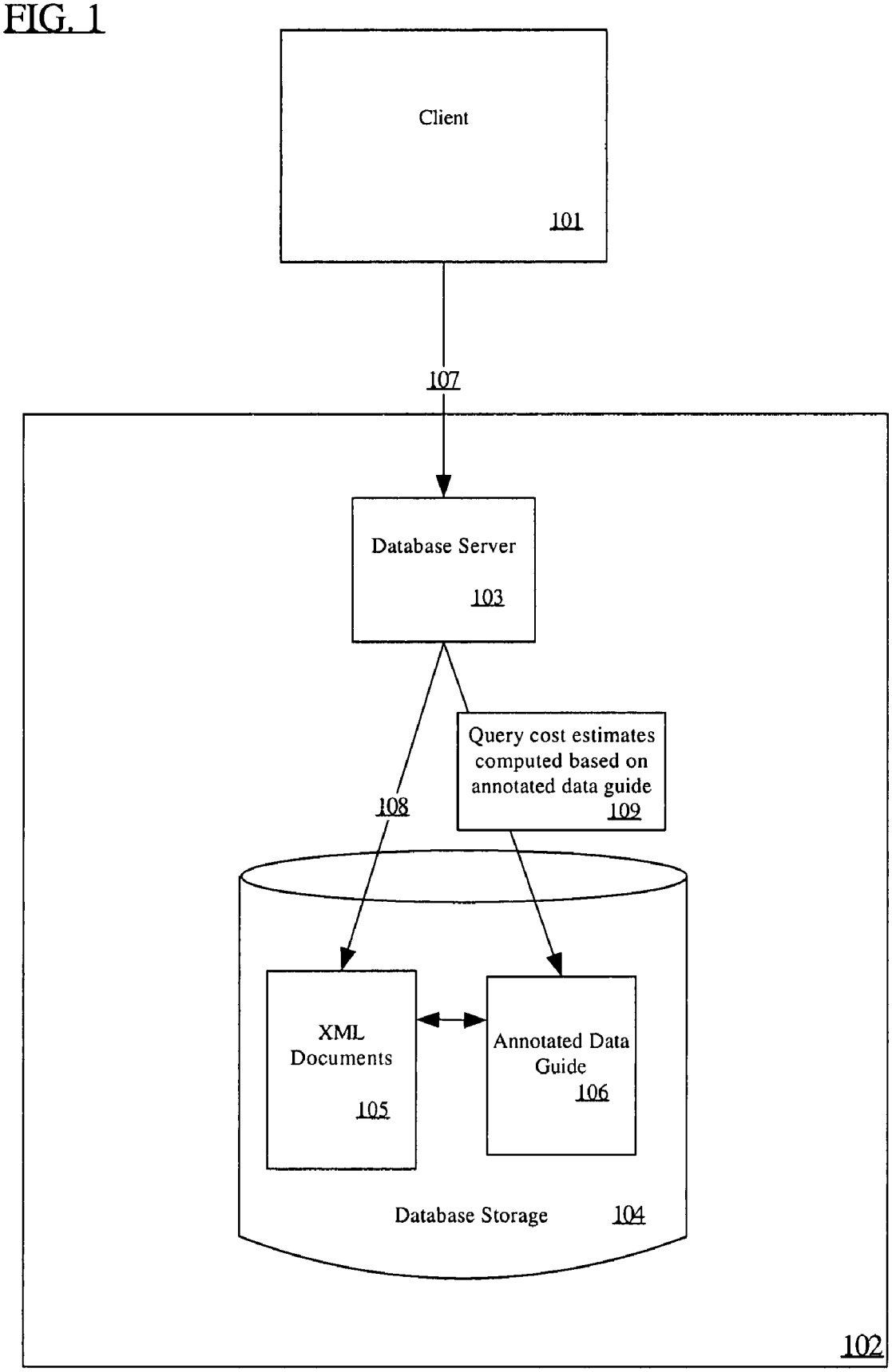
FIG. 1 is a block diagram depicting an embodiment of the database system showing interactions of the XML documents, the annotated data guide, the database server and the client.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches to estimate the cost to compute a query that contains an XPath expression. According to an embodiment, the approaches are used to estimate the cost of using the streaming evaluation to compute an XPath expression, although the present invention is not limited to use streaming evaluation.

Streaming evaluation is one of several ways of evaluating an XPath expression. Evaluation of an XPath expression can occur in several ways, including but not limited to, XML index-based evaluation, DOM-based evaluation and streaming evaluation. In XML index-based evaluation, an index of nodes in XML documents is used to retrieve elements and complex joins are used to evaluate the XPath expression. In DOM-based evaluation, XML documents are converted into a DOM-based tree model which is an in-memory hierarchical representation of the XML document. The DOM-based tree model can then be traversed to retrieve and evaluate elements based on the XPath expression. Streaming evaluation refers to techniques for transferring data such that the data can be processed as a steady and continuous stream, and keeping only minimal state information about the part of the document that was read. In addition to evaluating each expression separately, it is possible to evaluate a set of expressions on the same document using a single pass over the document using the streaming evaluation technique. Here, XPath expressions are placed into a syntactic construct called an XPathTable. The XPath expression can then be matched to the entry in the XPathTable in order to compute the evaluation.

In order to make an accurate estimate of the costs to compute a certain evaluation type, the database server analyzes statistics maintained for the XML documents. Based upon the statistics and the complexity of the query, an estimate of the cost is made. According to an embodiment, the cost of computing an XML query is the time and computing resources required for a server to complete the query. This includes the time necessary to store and retrieve data, and also the time and resources required to perform CPU cycles to complete the task.

Maintaining the Statistics

In order to estimate the costs of computing an XML query, information about the XML document is collected and stored. In an embodiment, statistics are stored as an annotated data guide. The annotated data guide is an XML structural summary that contains the names of the nodes that compose the DOM representation of the document along with annotations that contain aggregate statistical information included about each node. XML structural summaries are described in related U.S. patent application "A MECHANISM FOR COMPUTING STRUCTURAL SUMMARIES OF XML DOCUMENT COLLECTIONS IN A DATABASE SYSTEM", which is incorporated herein by reference.

An XML structural summary contains information about the structure of a collection of XML documents. The structural summary is a skeleton tree that represents all parent-child relationships found in a XML document collection. Specifically, a XML document collection is an empty XML document (i.e. document with nodes but no node values) such that if a node N1 is a child of node N2 in any document of the collection, then there is an empty node N1 as a child of node N2 in the structural summary. An empty node is one without a value.

Finally, the structural summary is minimal in that it contains a parent P of child C only if there is at least one document that contains a node C as a child of P. If there are two or more nodes C as a child of node P (i.e. two or more nodes with the same name that are a child of node P), then the structural summary contains only one node C as a child of node P. Thus, not every node is included in the structural summary.

As XML documents are stored in the database system, the database server will analyze the XML document and store statistics based on those XML documents which may involve updating the annotated data guide to reflect the documents. In an embodiment, for each of a set of nodes in the structural summary, at least the following information is maintained: the maximum number of children nodes, the minimum number of children nodes, the average number of children nodes, the maximum depth of the node, the minimum depth of the node, and the average depth of the node. This information demonstrates trends in the XML tree such as whether the XML tree is generally deep or flat and wide. For leaf nodes, the maximum size of the content, the minimum size of the content and the average size of the content is maintained. Additionally, the total number of XML documents and the average size of the XML documents are stored.

In an embodiment, statistics are not updated continuously by the database server but are done at the prompting of the database administrator. The database administrator runs a function to gather statistics for the entire database system that allows for the database server to perform queries more efficiently. The function may vary with each database system implementation. The function may be initiated, for example, by submitting a DDL (data definition language) command to a database server, such as the commands ANALYZE or Gather_Database_Stats.

When the function is run, the database server iterates over the input XML documents stored in the database system in a streaming fashion. For each node encountered, the function updates an in-memory hash table that maps the node read into the aggregate statistics of that specific node. Finally, the contents of the hash table are serialized in a streaming fashion into an XML document that represents the annotated data guide.

A rough estimate of the cost of an XML query can be determined based on the information in the annotated data guide and the size of the documents. The estimate determined is not an exact cost but a rough estimate that will be a guiding factor to decide the most efficient type of evaluation to use.

FIG. 1 is a block diagram illustrating an embodiment of the invention. The embodiment consists of the client 101 and the database system 102. The database system 102 includes the database server 103 and database storage 104. XML documents 105 are stored in the database storage area. Upon initiation of a database function to maintain statistics for the database system, the database server will analyze 108 the XML documents 105 and create an annotated data guide 106 which contains aggregate statistics of the XML documents.

The client 101, sends a query 107 to the database system 102. The database server 103 receives the query and determines an estimate of the cost by examining 109 the annotated data guide 106. Based upon the statistics and the formulas to follow, a cost estimate is produced which will provide guidance of which type of evaluation to perform.

Estimating the Cost of a Query with a Single XPath

In an embodiment of the invention, the total cost of a single XPath on a document consists of two sub-costs, the CPU cost and the I/O cost. More specifically, the total cost of a single XPath on a document is the weighted sum of the CPU cost and I/O cost and comprises the formula:

$$\text{Total Cost} = w_0 * (\text{CPU Cost}) + w_1 * (\text{I/O Cost})$$

$w_0$ and $w_1$ are dependent on the specific database system and configuration. The CPU cost is the amount of cycles it takes the server's central processing unit to complete a certain transaction. The input-size of an XML document is a factor in the CPU cost because the larger the document, the more cycles the CPU must spend to analyze the document. The output-size of the query is also a factor in the CPU cost. This is especially apparent when the output is the result of an XPath query. XPath queries can be very generic and result in 80% of the XML document being returned. XPath queries can also be very specific and result in only a single node. A generic XPath query yields a much higher cost than an XPath query resulting in only a single node.

In an embodiment of the invention, a formula is used to determine the rough CPU cost of the XPath query. This formula is:

$$\text{CPU Cost} = (f_0 * \text{input-size}) + (f_1 * \text{output-size})$$

The input-size is the size of the XML document to be queried and the output-size is the size of the output from the query. The CPU cost estimate is the sum of the input-size multiplied by a factor $f_0$ and the output size-multiplied by a factor $f_1$. The factors $f_0$ and $f_1$ are not specified values but are adjusted based upon the implementation of the particular database system.

The I/O cost, or input/output cost, is the amount of time and resources required to retrieve or store data on disk. The I/O cost is simply proportional to the size of the input XML document. In an embodiment, the formula for I/O cost is:

$$\text{I/O Cost} = \text{input-size}/\text{block size}$$

The I/O cost is the size of the input XML document divided by the block size. Block size is the size of a data block, usually expressed in number of bits or bytes. A data block is an atomic unit of storage allocated to storing database records (eg. rows). A database system and/or database server reads and writes records between persistent storage and volatile memory in units no smaller than a data block. The I/O cost has a higher factor than the CPU cost because retrieving and storing data on a disk is more time consuming than running a number of CPU cycles.

Input-Size

An XPath evaluation can occur on a base table column or on the result of an evaluated XPath. An XPath evaluation that occurs on a base table column is one that simply takes the whole XML document as input. Evaluations that occur on an already evaluated XPath, which occurs in a chained case, must first compute the output-size of that evaluated XPath.

If the evaluation is on a base table column, the input-size is the average size of the XML documents, which is stored as part of the annotated data guide. If the input is the result of an evaluated XPath, the input-size is based on the estimated output-size of the previous XPath. This is determined by analyzing the previously constructed XPathTable and estimating an output-size for that particular XPath operator. As stated previously, the XPathTable is a syntactic construct which allows for the computation of XPath expressions using streaming evaluation.

Output-Size

In an embodiment, the output-size is estimated from the annotated data guide statistics based upon whether the input is a base table column or an XPath operator. If the input is a base table column, the data guide of the column is accessed and the average size of the subtree or simple node rooted at the given XPath is computed.

If the input is the result from the XPathTable, the underlying base table column is obtained by following the input reference. Based upon the reference, the annotated data guide is accessed and an estimation of the output-size is made as in the above base table column case.

As an example, for the evaluation /a/b, an estimate of the size will have varying results if there are a hundred b's on average as opposed to if only a single b were present. These estimates are thus based on the input size, the annotated data guide and the XPath.

Estimating the Cost of a Query with Multiple XPaths

When evaluating multiple XPaths in a single document, the total cost remains the sum of the two sub-costs, the CPU cost and the I/O cost. The I/O cost remains the same since streaming over the document occurs only once. In an embodiment, the formula to calculate the CPU cost changes because there are multiple outputs.

$$\text{CPU Cost} = (g_0 \times \text{input size}) + (g_1 \times \text{output}_1\text{-size}) + (g_2 \times \text{output}_2\text{-size}) + \ldots \quad \text{I/O Cost} = \text{input size}/\text{block size}$$

Here, $g_0, g_1, g_2, \ldots$ are not specified values but depends upon the implementation of that particular database system. These factors are tuned based on performance analysis of the implementation. To determine the input size and block size, the steps as described earlier are followed. The output$_N$-size is the estimated size of the output of the Nth XPath. The output$_N$-size is estimated by following the steps as described under output-size.

Hardware Overview

Figure 2:
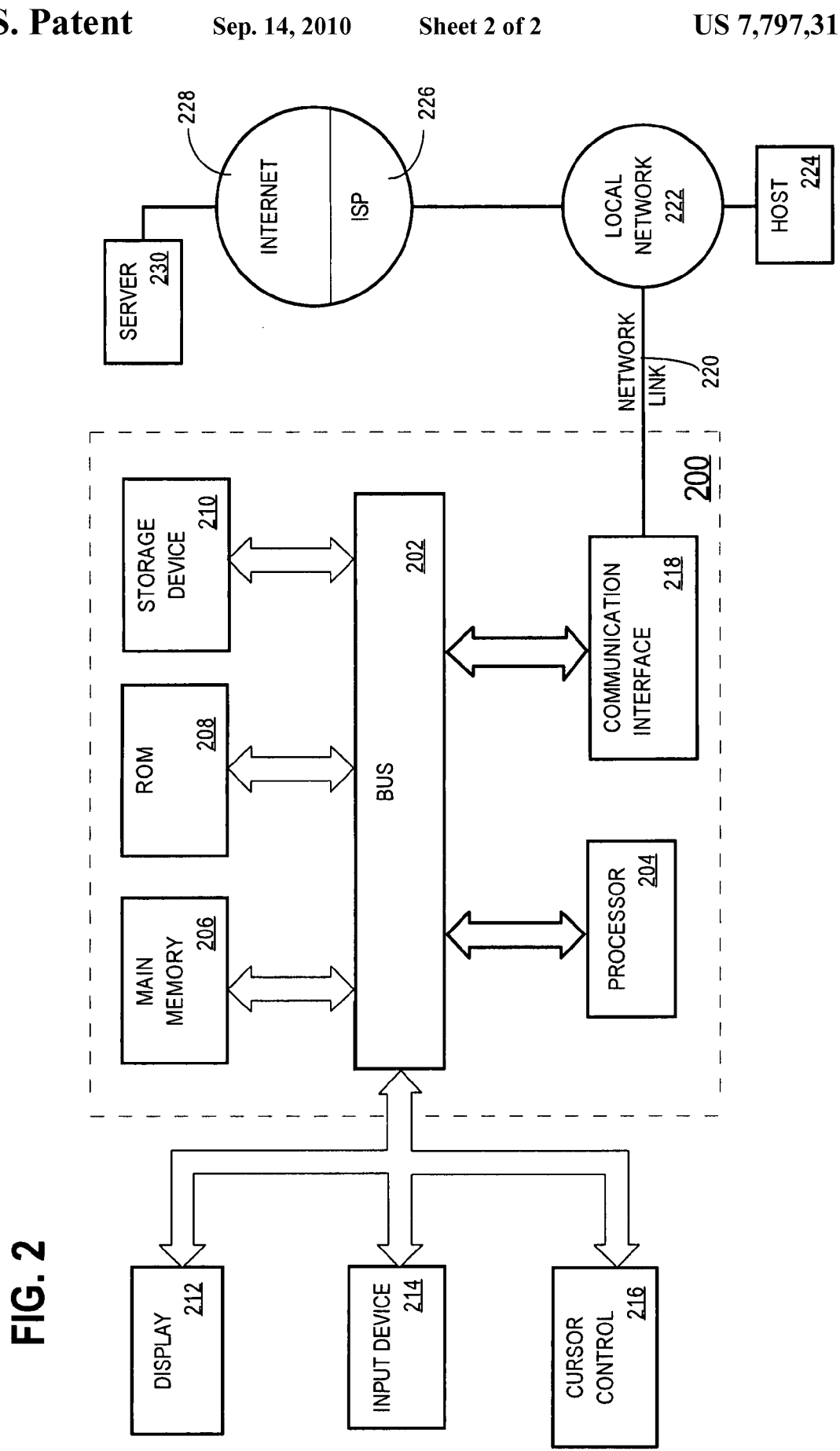
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to estimate a cost for computing a query on XML documents stored in a database, the method comprising the steps of:
   maintaining a plurality of statistics about nodes in said XML documents; based upon said plurality of statistics, estimating a cost for computing at least one path expression in said query on said XML documents, said cost comprising an estimated CPU cost and an estimated I/O cost;
   wherein the cost of computing the at least one path expression is determined based on a mathematical function of the estimated CPU cost and the estimated I/O cost;
   wherein computing said at least one path expression is performed using streaming evaluation;
   wherein estimating a cost for computing a path expression of the at least one path expression includes:
   estimating an input-size of said XML documents, said input-size being based on units of bytes;
   based on a portion of said plurality of statistics about said nodes, estimating an output-size associated with said path expression;
   wherein the steps are performed by one or more computing devices.

2. The method of claim 1 wherein said statistics are maintained upon receipt of a command to gather statistics for the database system.

3. The method of claim 1, wherein said statistics are stored in an XML structural summary of said XML documents, with annotations that contain statistics about each node in said XML structural summary.

4. The method of claim 1 wherein the cost of computing the query is the weighted sum of an estimated CPU cost and an estimated I/O cost.

5. The method of claim 4 wherein said estimated CPU cost is computed with an input size of data to be queried, a size of the output from the query and a plurality of factors specific to an implementation of the database system.

6. The method of claim 5, wherein said input size of data to be queried consists of a size of the XML document to be queried or an output size of an evaluated query containing an XPath expression.

7. The method of claim 5 wherein CPU cost is a sum of a first product and a second product, wherein the first product is a product of a factor specific to the database system implementation and the input size of data to be queried; and the second product is a product of a second factor specific to the database system implementation and the size of output from the query.

8. The method of claim 5, wherein CPU cost in a query with multiple XPath expressions is the sum of a first product, a second product, a third product, and an Nth product, wherein the first product is a product of a first factor specific to the database system implementation and the input size of data to be queried;

the second product is a product of a second factor specific to the database system implementation and the size of output from the first query;

the third product is a product of a third factor specific to the database system implementation and the size of output from the second query; and the Nth product is a product of an Nth factor specific to the database system implementation and the size of output from the (N-1) query.

9. The method of claim 4 wherein the I/O cost is determined by computing an input size of data to be queried divided by a size of the data block used by the database system to read and write data.

10. The method of claim 1, wherein the XML documents are stored in binary form in the database.

11. The method of claim 1, wherein the XML documents are stored in text form in the database.

12. The method of claim 1, wherein the XML documents are stored in object relational form in the database.

13. The method of claim 4 wherein Total cost is a sum of a first product and a second product, wherein the first product is a product of a factor specific to the database system implementation and the estimated CPU cost; and the second product is a product of a second factor specific to the database system implementation and the estimated I/O cost.

14. A computer-readable volatile or non-volatile storage medium storing one or more sequences of instructions which, when executed by one or more processors, causes the one or more processors to perform: maintaining a plurality of statistics about nodes in said XML documents;

based upon said plurality of statistics, estimating a cost for computing at least one path expression in said query on said XML documents, said cost comprising an estimated CPU cost and an estimated I/O cost;

wherein the cost of computing the at least one path expression is determined based on a mathematical function of the estimated CPU cost and the estimated I/O cost;

wherein computing said at least one path expression is performed using streaming evaluation;

wherein estimating a cost for computing a path expression of the at least one path expression includes:

estimating an input-size of said XML documents, said input-size being based on units of bytes;

based on a portion of said plurality of statistics about said nodes, estimating an output-size associated with said path expression.

15. The computer-readable volatile or non-volatile storage medium of claim 14, wherein said statistics are maintained upon receipt of a command to gather statistics for the database system.

16. The computer-readable volatile or non-volatile storage medium of claim 14, wherein said statistics are stored in an XML structural summary of said XML documents, with annotations that contain statistics about each node in said XML structural summary.

17. The computer-readable volatile or non-volatile storage medium of claim 14, wherein the cost of computing the path expression is the weighted sum of the estimated CPU cost and the estimated I/O cost.

18. The computer-readable volatile or non-volatile storage medium of claim 17, wherein said estimated CPU cost is computed with an input size of data to be queried, a size of the output from the query and a plurality of factors specific to an implementation of the database system.

19. The computer-readable volatile or non-volatile storage medium of claim 18, wherein said input size of data to be queried consists of a size of the XML document to be queried or an output size of an evaluated query containing an XPath expression.

20. The computer-readable volatile or non-volatile storage medium of claim 18, wherein CPU cost is a sum of a first product and a second product, wherein the first product is a product of a factor specific to the database system implementation and the input size of data to be queried; and the second product is a product of a second factor specific to the database system implementation and the size of output from the query.

21. The computer-readable volatile or non-volatile storage medium of claim 18, wherein CPU cost in a query with multiple XPath expressions is the sum of a first product, a second product, a third product, and an Nth product, wherein the first product is a product of a first factor specific to the database system implementation and the input size of data to be queried;

the second product is a product of a second factor specific to the database system implementation and the size of output from the first query;

the third product is a product of a third factor specific to the database system implementation and the size of output from the second query; and the Nth product is a product of an Nth factor specific to the database system implementation and the size of output from the (N-1) query.

22. The computer-readable volatile or non-volatile storage medium of claim 17, wherein the I/O cost is determined by computing an input size of data to be queried divided by a size of the data block used by the database system to read and write data.

23. The computer-readable volatile or non-volatile storage medium of claim 14, wherein the XML documents are stored in binary form in the database.

24. The computer-readable volatile or non-volatile storage medium of claim 14, wherein the XML documents are stored in text form in the database.

25. The computer-readable volatile or non-volatile storage medium of claim 14, wherein the XML documents are stored in object relational form in the database.

26. The computer-readable volatile or non-volatile storage medium of claim 17, wherein Total cost is a sum of a first product and a second product, wherein the first product is a product of a factor specific to the database system implementation and the estimated CPU cost; and the second product is a product of a second factor specific to the database system implementation and the estimated I/O cost.

\* \* \* \* \*

UNITED STATES PATENT AND TRADEMARK OFFICE
CERTIFICATE OF CORRECTION

| | | |
|---|---|---|
| PATENT NO. | : 7,797,310 B2 | Page 1 of 1 |
| APPLICATION NO. | : 11/716505 | |
| DATED | : September 14, 2010 | |
| INVENTOR(S) | : Sam Idicula et al. | |

It is certified that error appears in the above-identified patent and that said Letters Patent is hereby corrected as shown below:

On page 4, in column 2, under "Other Publications", line 9, delete "Administator's" and insert -- Administrator's --, therefor.

On page 5, in column 2, under "Other Publications", line 15, delete "XQuey" and insert -- XQuery --, therefor.

In column 4, line 33, delete "Gather_Database_Stats." and insert -- GATHER_DATABASE_STATS. --, therefor.

In column 9, line 9, in claim 4, delete "query" and insert -- path expression --, therefor.

In column 9, line 9, in claim 4, delete "an" and insert -- the --, therefor.

In column 9, line 9, in claim 4, delete "an" and insert -- the --, therefor.

Signed and Sealed this
Sixteenth Day of August, 2011

David J. Kappos
*Director of the United States Patent and Trademark Office*